United States Patent
Faulk

(10) Patent No.: US 8,838,719 B1
(45) Date of Patent: Sep. 16, 2014

(54) TECHNIQUES FOR SENDER-VALIDATED MESSAGE TRANSMISSIONS

(71) Applicant: Anne O. Faulk, Chattanooga, TN (US)

(72) Inventor: Anne O. Faulk, Chattanooga, TN (US)

( * ) Notice: Subject to any disclaimer, the term of this patent is extended or adjusted under 35 U.S.C. 154(b) by 0 days.

(21) Appl. No.: 14/059,009

(22) Filed: Oct. 21, 2013

(51) Int. Cl.
*G06F 15/16* (2006.01)
*H04L 12/58* (2006.01)

(52) U.S. Cl.
CPC ................... *H04L 51/043* (2013.01)
USPC ............ 709/206; 709/203; 709/204; 709/207

(58) Field of Classification Search
CPC ......... H04L 12/00; H04L 12/18; H04L 12/56; H04L 12/2602
USPC .................. 709/203, 204, 206, 207
See application file for complete search history.

(56) References Cited

U.S. PATENT DOCUMENTS

| 8,103,719 | B2 | 1/2012 | Weiser et al. |
| 2004/0230697 | A1 * | 11/2004 | Kiss et al. ..................... 709/245 |
| 2010/0174779 | A1 * | 7/2010 | Weiser et al. ................. 709/203 |
| 2011/0125844 | A1 | 5/2011 | Collier et al. |

FOREIGN PATENT DOCUMENTS

| EP | 2328309 | 6/2011 |
| WO | WO 2010028576 A1 * | 3/2010 |

* cited by examiner

*Primary Examiner* — David X Yi
(74) *Attorney, Agent, or Firm* — Kilpatrick Townsend & Stockton LLP

(57) ABSTRACT

Disclosed are various embodiments for filtering objectionable content from messages prior to transmission of the messages to recipients. A message is obtained for which a sender seeks to transmit, via a network, to one or more recipients. An examination is determined that is to be performed upon the message, where the examination is selected from among a set of available examinations. An action is initiated for the message, where the action is determined based upon a result of the examination. The action includes at least one of: transmitting the message to the recipients, requesting the sender to review the message, modifying the message, and deleting the message.

23 Claims, 4 Drawing Sheets

TECHNIQUES FOR SENDER-VALIDATED MESSAGE TRANSMISSIONS

BACKGROUND

Communications systems exist that filter offensive or other types of prohibited content (e.g. text, images, audio, video, etc.) and block it from reaching recipients. Typically, these systems filter and block such content by recognizing the sender as one of a group of "black list" senders and/or by recognizing communications data that includes offensive or prohibited content. In some systems, a system administrator or an automated system itself can remove the prohibited content and/or replace it with acceptable forms. These filtering systems are especially useful for parental controls and for reducing the amount of spam that would otherwise plague email users. However, current systems are not designed to allow users to recognize and potentially block content they themselves intend to transmit to recipients.

Over a billion individuals use social media to communicate with "friends" and followers. The dark side of these one-to-many communication tools is the damage that can be done when a user, perhaps during a lapse of judgment, sends a message containing content that is offensive, objectionable, controversial, or prohibited, thus causing damage to the sender's reputation.

However, content that is considered routine by one community may be deemed distasteful by another. Epithets that are commonly used by a member of a group may be judged harshly when used by an outsider to that group. For that reason, in order to more accurately identify potentially offensive content, it may be advantageous to examine the content, while knowing the identity of the sender and the intended recipients.

SUMMARY OF THE INVENTION

The disclosed embodiments relate to a system, computer-readable medium, and methods for validating the "allowability" of messages on behalf of the message sender in a networked environment. "Allowability" may mean different things in different contexts, such as whether the content of the message is or is likely to be: objectionable or offensive to certain recipients (e.g., vulgar, profane, obscene, insensitive, politically incorrect, etc.); embarrassing to the sender or to someone close to the sender (e.g., photo or statement that the sender is likely to regret sending/making); in violation of any particular rules, policies, codes, etc. In some embodiments, a validation service executed by a server device obtains a sender-generated message to be transmitted via a network to recipients. The validation service may determine an action to be initiated in response to the message. The action may be based upon a set of rules and an examination comprising a review by a group of people predefined by the sender.

The group of people may include ones of a group of candidate reviewers that accepted an invitation to participate in the review. The result of the examination may indicate whether the message is allowable based upon content of the message and/or metadata associated with the message. The set of rules define the action in response to the result. The validation service initiates the action determined for the message that may include one or more of: transmitting the message to the recipients, requesting the sender to review the message, modifying the message, deleting the message, and archiving the message.

In other embodiments, a validation service executed by a server device obtains a sender-generated message to be transmitted via a network to recipients. The validation service determines an examination to be performed upon the message, where the examination is selected from among a set of available examinations that may include a review of the message by at least one person predefined by the sender. The review indicates whether the message is allowable based upon content of the message and/or metadata associated with the message. The content of the message may include text, images, video, and/or audio, etc.

The validation service may initiate an action for the message, where the action is determined based upon a result of the examination. The types of actions may include at least one of: transmitting the message to the recipients, requesting the sender to review the message, modifying the message, and deleting the message. The validation service may store a log associated with validation of the message, where the log may include the message, any review of the message, and the action initiated for the message.

In still other embodiments, a validation service executed by a computing device may obtain a sender-generated message to be transmitted via a network to recipients. The validation service determines an examination to be performed upon the message, where the examination is selected from among a set of available examinations that may include at least one of: an automated examination of content or metadata associated with the message, a challenge-response examination, and a review of the message by a group of one or more people predefined by the sender. The review, if selected, indicates whether the message is allowable based upon content of the message and/or metadata associated with the message. The content of the message may include text, images, video, and/or audio, etc.

The validation service may initiate an action for the message, where the action is determined based upon a result of the examination. The types of actions may include at least one of: transmitting the message to the recipients, requesting the sender to review the message, modifying the message, and deleting the message. The validation service may store a log associated with validation of the message, where the log may include the message, any review of the message, and the action initiated for the message.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same.

Figure 1:
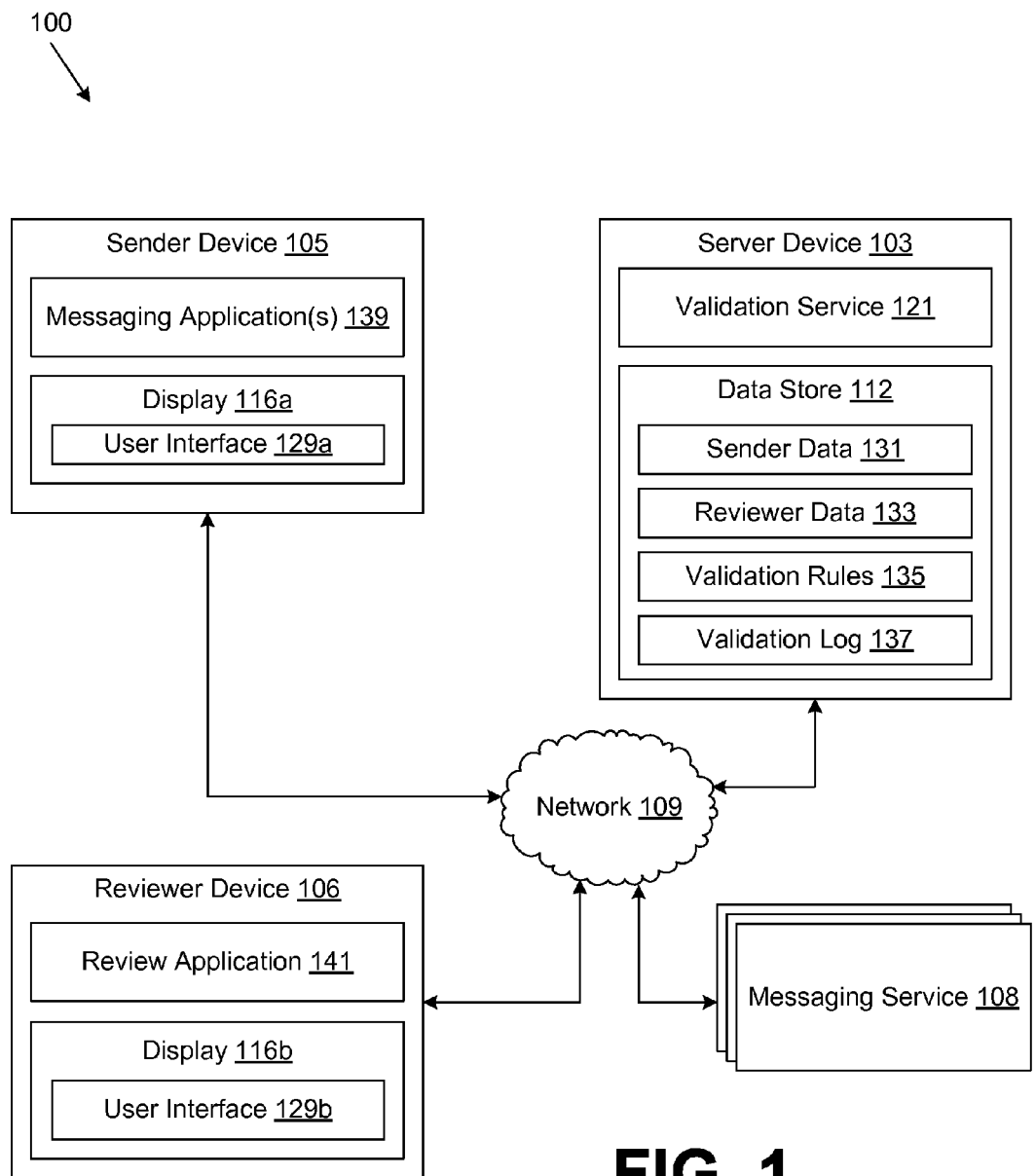
FIG. 1 is a drawing of a networked environment according to various embodiments of the present disclosure.

With reference to FIG. 1, shown is a networked environment 100 according to various embodiments. The networked environment 100 includes a server device 103, a sender device 105, a reviewer device 106, and messaging services 108, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, cellular networks, Ethernet networks, and other types of networks.

The server device 103 may comprise, for example, a server computer or any other system providing computing capability. Alternatively, the server device 103 may employ a plurality of computing devices that may be arranged, for example, in one or more server banks or computer banks or other arrangements. Such computing devices may be located in a single installation or may be distributed among many different geographical locations. For example, the server device 103 may include a plurality of computing devices that together may comprise a hosted computing resource, a grid computing resource and/or any other distributed computing arrangement. In some cases, the server device 103 may correspond to an elastic computing resource where the allotted capacity of processing, network, storage, or other computing-related resources may vary over time.

Various applications and/or other functionality may be executed by the server device 103 according to various embodiments. Accordingly, the server device 103 may include a processor and may also include and/or have access to (e.g., via a dedicated connection and/or a network connection) a memory, such as a data store 112, that stores application(s), other executable code or instructions and various data, as shown and described in more detail with respect to FIG. 4. The illustrated data store 112 may be representative of a plurality of data stores 112 as can be appreciated. The data stored in the data store 112, for example, is associated with the operation of the various applications and/or functional entities described below.

The functional components executed by the server device 103, for example, include a validation service 121 and other applications, services, processes, systems, engines, or functionality not discussed in detail herein. The validation service 121 is executed to validate the "allowability" of messages to be transmitted by from a sender to one or more recipients. The messages are validated according to various types of examinations that may be selected by the sender and/or predefined in a set of rules based upon various possible criteria.

The data stored in the data store 112 includes, for example, sender data 131, reviewer data 133, validation rules 135, a validation log 137, and potentially other data. The sender data 131 may specify data associated with one or more message senders, the sender devices 105 associated with each sender, available messaging services 108, and potentially other data. As a non-limiting example, the sender data 131 may include user accounts, credentials for the sender and other users, credentials for the sender device(s) 105 associated with the sender, credentials for the messaging services 108 used by the sender, recipient contact lists, permissions associated with the user accounts, prohibited and/or allowed message content, prohibited and/or allowed message metadata (e.g. places, times, etc.), and other possible data.

The reviewer data 133 specifies data associated with any reviewers for each sender. The reviewer data 133 may include status of the reviewer, contact information for the reviewer, the identity of the sender(s) associated with the reviewer, credentials for the reviewer and/or for the reviewer device 106, permissions associated with the reviewer, and/or other possible data. The validation rules 135 specify various possible data associated with validating an incoming message for a sender. As a non-limiting example, the validation rules 135 may specify various criteria for determining the type(s) of examination to be performed upon the message, the reviewer(s) to be used to review the message, the types of responses available to the reviewer(s), actions to be performed based on the result of the examination(s), whether the actions are mandatory or discretionary, and/or other possible data as can be appreciated. In some embodiments, the sender may administer their own validation rules 135. In other embodiments, one or more other users may administer the validation rules 135 for the sender, either instead of or in addition to the capability of the sender to administer the validation rules 135.

The validation log 137 stores various data associated with the activities of the validation service 121 and the parties with which the validation service 121 communicates. As a non-limiting example, the validation log 137 may include a message to be validated by a sender, the examination determined for the message, any reviewers selected for the review, the response from the reviewers, the action initiated for the message based on the result of the examination, and/or other possible data.

The illustrated sender device 105 is representative of a plurality of sender devices that may be coupled to the network 109. The sender device 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The sender device 105 may include a display 116a. The display 116 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. Other components of a typical sender device 105, such as a processor, memory and network interface are shown and described in more detail with respect to FIG. 4.

The sender device 105 may be configured to execute various applications such as a messaging application 139 and/or other applications. The messaging application 139 may be executed in a sender device 105, for example, to transmit a message to one or more recipients where the allowability of the message is validated prior to transmission to the recipients, thereby rendering a user interface 129a on the display 116a. To this end, the messaging application 139 may comprise, for example, a browser, a dedicated application, a plug-in to another application, etc., and the user interface 129a may comprise a network page, an application screen, etc. The sender device 105 may be configured to execute applications beyond the messaging application 139 such as, for example, email applications, social networking applications, word processors, spreadsheets, and/or other applications.

The illustrated reviewer device 106 is representative of a plurality of reviewer devices that may be coupled to the network 109. The reviewer device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The reviewer device 106 may include a display 116*b*. Other components of a typical reviewer device 106, such as a processor, memory and network interface are shown and described in more detail with respect to FIG. 4.

The reviewer device 106 may be configured to execute various applications such as a review service 141 and/or other applications. The review application 141 may be executed by a reviewer device 106, for example, to review a message requested for transmission to one or more recipients by a sender associated with the reviewer, thereby rendering a user interface 129*b* on the display 116*b*. To this end, the review application 141 may comprise, for example, a browser, a dedicated application, a plug-in to another application, etc., and the user interface 129*b* may comprise a network page, an application screen, etc. The reviewer device 106 may be configured to execute applications beyond the review application 141 such as, for example, email applications, social networking applications, word processors, spreadsheets, and/or other applications.

The messaging service 108 represents one or more messaging services executed by a computing device that may receive messages for transmission to one or more recipients. As a non-limiting example, the messaging service 108 may be a simple mail transport protocol (SMTP) gateway, a short message service/multimedia message service (SMS/MMS) gateway, a proprietary message gateway (TWITTER, FACEBOOK, etc.), and/or another possible messaging interface. In some embodiments, a given message may be sent to recipients using one or more of the messaging services 108, as well as directly to a computing device associated with a recipient, i.e., a recipient device 106.

Next, a general description of the operation of the various components of the networked environment 100 is provided. To begin, a sender interacts with the messaging application 139 to create a message for validation and delivery to one or more recipients. To that end, the message may eventually be delivered to the messaging service 108 via the network 109 to facilitate delivery of the message to the recipients. In some embodiments, the messaging application 139 may be a standalone application in which the sender inputs the message through a user interface 129*a* for the messaging application 139.

In other embodiments, the messaging application 139 may include or be accompanied by a monitoring service to enforce use of the messaging application 139 for communicating messages via one or more of the messaging services 108. For example, the monitoring service may recognize and intercept calls to initiate the application for TWITTER and will instead initiate the messaging application 139, thereby requiring use of the messaging application 139 to send a message using TWITTER. Similarly, the monitoring service may monitor communications of a browser application in the sender device 105, such that attempts to compose or send a message through the browser to one or more of the messaging services 108 will instead initiate the messaging application 139.

In still other embodiments, the messaging application 139 may be a plug-in to or a proxy service for other applications, where the user creates the message using these other applications, which, in turn, provide the message to the messaging application 139 for validation and possible delivery.

The messaging application 139 delivers the message to the validation service 121 via the network 109 using hypertext transfer protocol (HTTP), HTTP secure (HTTPS), remote procedure call (RPC), user datagram protocol (UDP), transmission control protocol (TCP), Internet protocol (IP), and/or other network protocols as can be appreciated. The messaging application 139 and/or sender device 105 may use one or more credentials to authenticate the sender and/or sender device 105 with the validation service 121. Once the message is received by the validation service 121 and the sender and/or sender device 105 identified within the sender data 131, the validation service 121 retrieves the predefined validation rules 135 in order to determine the next operations for validation of the message.

The validation rules 135 may indicate the one or more examinations to be performed upon the message in order to validate the allowability of the message, as may be specified by or on behalf of the sender. The validation rules 135 may include generic and/or default rules that may be applied to one or more senders, as well as rules that are specific to each sender. The validation rules 135 may be created, modified, and/or deleted by the sender according to various permissions that may be specified in the sender data 131. In some embodiments, other users may create, modify, and/or delete individual ones of the validations rules 135 for various senders according to permissions that may also be specified in the sender data 131. For example, a parent, a coach, or other authorized user may insert a rule that requires any message sent after midnight to be reviewed by them or another approved reviewer prior to the message being delivered to recipients.

As another example, the validation rules 135 associated with the sender may specify that all messages received for transmission before 8 PM may be validated by performing an automated scan of the content of the message (e.g. text, image(s), video, audio, etc.) for prohibited content using various possible techniques as can be appreciated by one of ordinary skill in the art. All or portions of the automated scan may be conducted by the validation service 121 or by services accessible via the network 109. The prohibited content for the sender may include one or more standardized list(s) of prohibited content, as well as a specification of items that may be specifically allowed or prohibited for the particular sender. For example, a message stating that a user is drinking a beer may generally be allowable, but may be prohibited for the particular sender if the particular sender is under the legal drinking age. Similarly, a message containing an image of a beer may be generally allowable, but blocked for a given sender based on the age and/or identity of the sender, etc.

As another example, the validation rules 135 may specify that any message to be sent via TWITTER or another social media messaging service 108 must be reviewed by one or more reviewers predefined for the sender. In order to become a reviewer, users identified as "candidate reviewers" by the sender or other authorized party for the sender may be sent an invitation to become a reviewer for a sender. If the invitation is accepted by a candidate reviewer, the candidate reviewer may provide additional contact information and may thereafter be designated as a reviewer for the sender. In some embodiments, an invitation to a candidate reviewer may be sent along with the review request for a message, such that the candidate reviewer becomes a reviewer for the message once the invitation is accepted. Particular reviewers may be explicitly designated in the validation rules 135, or the rules may indicate that any one or more of the reviewers associated with the sender is acceptable.

In this example, the validation rules 135 may further specify the structure of the response that may be provided by the reviewer(s). This response to the message from the reviewer(s) may be a binary "allow" or "reject," permit the reviewer(s) to edit or suggest edits to the message to indicate an acceptable form or delete or redact unacceptable content, or to accept or reject the message and also provide comments to include in the response.

In this "peer review" model for message validation, validation service 121 may transmit a review request or similar notice to the reviewer device 106 associated with a given reviewer, where the review request may include a copy of the message and, potentially, the possible responses. The reviewer data 133 may include one or more contact methods for each reviewer, as well as criteria for determining preferred and alternate methods of contact for each of the reviewers. For example, during business hours, the preferred contact method for a reviewer may be at his/her work email address or work smartphone number, whereas after business hours, contact via his/her personal email address and/or phone number may be preferred. In some instances, the review request may be handled by a review application 141 executing in a laptop computer, smartphone, tablet computer, or other type of computing device. However, in some embodiments a review application 141 is unnecessary and review requests and responses may be exchanged between the validation service 121 and the reviewer device 106 via SMS/MMS, email, or other standard communication protocol as can be appreciated.

In still other embodiments, review requests may be delivered from a sender device 105 to a reviewer device 106 with or without coordination from the validation service 121. In these embodiments, the messaging application 139 may interact with the validation service 121 in order to determine, for example, the reviewer device(s) 106 to send review request(s), the possible actions rules for the message, and the rules for determining the action to initiate. Thereafter, the messaging application 139 may transmit the review requests to the reviewer device(s) 106, receive the response(s), and/or initiate the defined action for the message based on the response(s). In yet other embodiments, the validation service 121 may be executed by the sender device 105.

In embodiments in which the message is retained on the sender device 105 until a result of the validation is determined, the messaging application 139 may use a variety of operations to effect delivery of the message, if this is the action that is determined. In some embodiments, the messaging application 139 may interact with other messaging application(s) (TWITTER, FACEBOOK, etc.) executable by the sender device 105 in order to initiate delivery of the message by these respective messaging application(s). In other embodiments, the messaging application 139 may communicate via the network 109 with the appropriate messaging service(s) 108 in order to deliver the message. In still other embodiments, the messaging application 139 may initiate delivery of the message by first transmitting the message to the validation service 121, where the messaging application 139 may indicate that the message has been previously determined to be allowable.

Once a reviewer receives the review request associated with a message from a sender, the reviewer may then review the message and respond using a messaging function of the review application 141, SMS/MMS, email, or other possible communication medium. The response from each reviewer may then be collected by the validation service 121 in order to compile a result for the "peer review examination" and to determine the action to be undertaken for the message according to the validation rules 135. For example, if a threshold number of reviewers respond to accept the message, the validation rules 135 may specify that, based on the result, the message is automatically transmitted by the validation service 121 for delivery to the recipients. Likewise, if the result indicates that a threshold number of responses reject the message, the validation rules 135 may specify that the message should be automatically deleted or made available to the sender for editing and resubmission.

In some embodiments, the validation rules 135 may further specify whether an action determined in response to the result of an examination is mandatory or discretionary. For example, if the action for a message is determined to be automatic deletion of the message, the validation rules 135 may specify whether the action must be carried out or whether the sender may override the action. In addition, the various activities associated with validating a message may be captured by the validation service 121 in the validation log 137.

In other embodiments, the validation rules 135 may further specify particular reviewers who ultimately have veto power, in that regardless of other reviewers who may respond to allow a message, if the reviewer with veto power responds to reject the message, the message is not allowed. Similarly, if a reviewer has been granted veto power and this reviewer does not respond within a threshold of time, the validation rules 135 may specify that the message cannot be allowed. Alternatively, if a veto-holding reviewer does not respond within a threshold of time, the validation rules 135 may specify that threshold of responses for allowing the message may increase, for example, from more than 50% to more than 75%.

Figure 2:
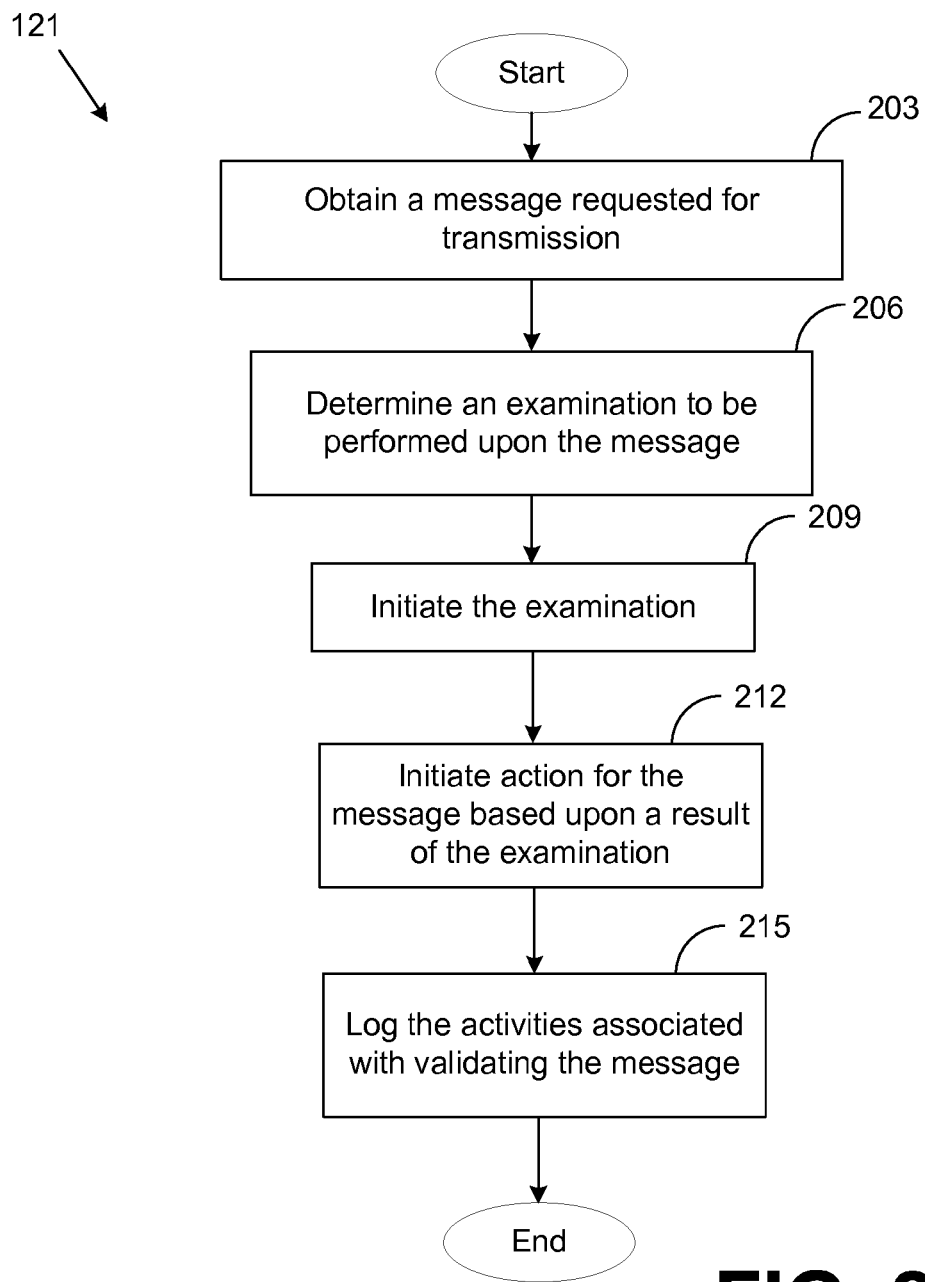
FIG. 2 is a flowchart illustrating one example of functionality implemented as portions of a validation service executed in a server device in the networked environment of FIG. 1 according to various embodiments of the present disclosure.

Referring next to FIG. 2, shown is a flowchart that provides one example of the operation of a portion of the validation service 121 according to various embodiments. It is understood that the flowchart of FIG. 2 provides merely an example of the many different types of functional arrangements that may be employed to implement the operation of the portion of the validation service 121 as described herein. As an alternative, the flowchart of FIG. 2 may be viewed as depicting an example of elements of a method implemented in the server device 103 (FIG. 1) or other network-connected computing device according to one or more embodiments.

The flowchart of FIG. 2 depicts the general operation of the validation service 121 during the course of validating a message from a sender. Beginning with block 203, the validation service 121 obtains a message from the messaging application 139 that the sender has requested for transmission to one or more recipients. In some embodiments, a sender interacts with the messaging application 139 to create the message for validation and delivery to one or more recipients. To that end, the message may eventually be delivered to the messaging service 108 via the network 109 to facilitate delivery of the message to the recipients. In some embodiments, the messaging application 139 may be a stand-alone application in which the sender inputs the message through a user interface 129*a* for the messaging application 139.

In other embodiments, the messaging application 139 may include or be accompanied by a monitoring service to enforce use of the messaging application 139 for communicating messages via one or more of the messaging services 108. For example, the monitoring service may recognize and intercept calls to initiate the application for TWITTER and will instead initiate the messaging application 139, thereby requiring use of the messaging application 139 to send a message using TWITTER. Similarly, the monitoring service may monitor communications of a browser application in the sender device 105, such that attempts to compose or send a message through the browser to one or more of the messaging services 108 will instead initiate the messaging application 139.

In still other embodiments, the messaging application 139 may be a plug-in to or a proxy service for other applications, where the user creates the message using these other applications, which, without requiring interaction by the sender, provide the message to the messaging application 139 for validation and possible delivery. The messaging application 139 or other source may use one or more credentials to authenticate the sender with the validation service 121.

Next, in block 206, the validation service 121 retrieves the predefined validation rules 135 in order to determine the next operations for validation. The validation rules 135 may indicate the one or more examinations to be performed upon the message in order to validate the allowability of the message, as may be specified in the validation rules 135 by, or on behalf of, the sender. The examinations may include one or more of a "peer review" of the message by one or more people predefined as reviewers, an automated scan of the content and/or metadata associated with the message, a challenge-response test to assess the cognitive state of the sender, a "self review" request inviting the sender to reconsider the message, a "cooling off" waiting period prior to sending the message (along with a possible notice to the sender that he/she has the opportunity to modify or retract the message before expiration of the waiting period), and/or other possible types of examination, as can be appreciated. For example, the validation rules 135 for the sender may specify that all messages must first undergo an automated scan and/or peer-review prior to sending or to being subjected to further examinations, that all messages sent after midnight or during any other particular periods or time must undergo peer review in addition to any other types of reviews, that messages sent when the sender is determined to be in a particular location (e.g., a bar, club, etc.) must undergo certain types of review, etc. The location of the sender device 105 may be determined using one or more geographic location services, such as global position system (GPS), cell network location, network address location, and/or other location services as can be appreciated.

Then, in block 209, the validation service 121 may initiate the examination(s) for the message. For example, the validation service 121 may initiate an automated scan of a message based on the validation rules 135. The automated scan may examine the metadata and/or content of the message (e.g. text, image(s), video, audio, etc.). In this example, the metadata associated with the message may indicate that the message was generated by the sender device 105 at 2 AM while located in Chicago. Using the sender data 131, the automated scan can determine that the sender is 16 years old and that a curfew exists in Chicago after midnight for anyone 18 years old and younger.

In addition, the validation rules 135 for this example may further specify that a challenge-response test should be undertaken by the sender for any message sent after 1 AM. In order to carry-out the test, the validation service 121 may transmit, via the network 109, the particular challenge-response test information to the messaging application 139 or other communication service available on the sender device 105. Various types of challenge-response tests may be given that may be used to test the cognitive abilities of the sender such as a "Completely Automated Public Turing test to tell Computers and Humans Apart" (CAPTCHA), solving arithmetic problems, asking predefined questions, etc. The response of the sender, as well as potentially the number of incorrect responses, the length of time to respond, etc. may be used to evaluate cognitive impairment of the sender.

Subsequently, in block 212, the result(s) of the examination(s) may be evaluated to determine an action to be applied to the message. Continuing the previous example, if the automated scan determined the message violated the city-wide curfew and the challenge-response exam determined the user is impaired, the validation service 121 may send a system notice to the sender device 105 describing the detected result(s) and that message will be automatically deleted, or may be delayed for 12 hours and later re-evaluated for transmission. Alternatively, if the sender has only violated curfew, but is not impaired, the validation service 121 may transmit a system notice to the sender device 105 describing the detected result(s) and requesting confirmation from the sender before sending, or perhaps imposing a brief "cooling off" period before delivering the message to the recipients.

Next, in block 215, the validation service may log the message obtained from the sender, the examinations undertaken, the result(s) of the exams, and/or other data associated with the validation. Thereafter, this portion of the execution of the validation service 121 may end as shown.

Figure 3:
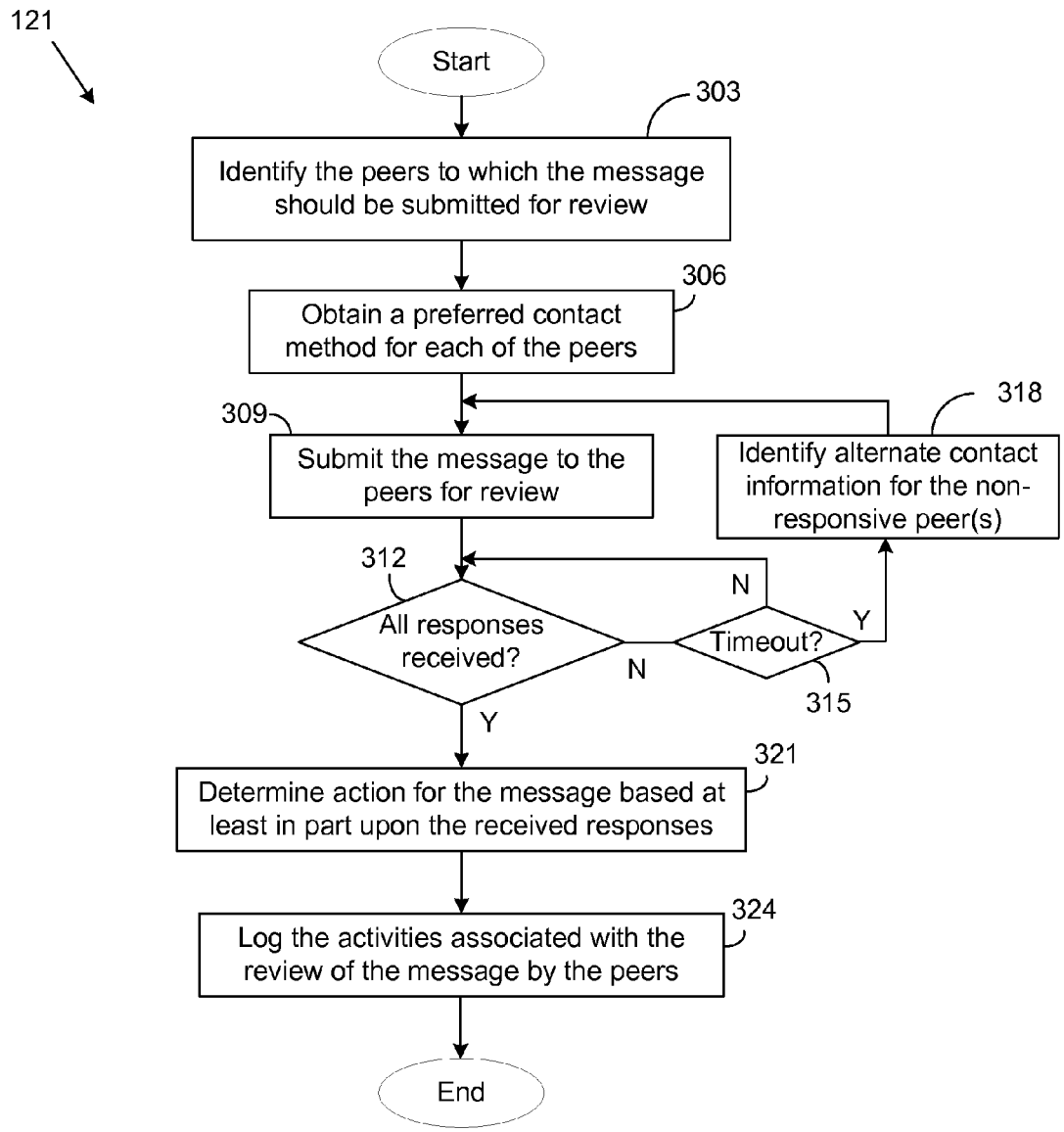
FIG. 3 is a flowchart illustrating another example of functionality implemented as portions of the validation service executed in a server device in the networked environment of FIG. 1 according to various embodiments of the present disclosure.

Turning now to FIG. 3, shown is a flowchart that provides another example of the operation of a portion of the validation service 121 according to various embodiments. It is understood that the flowchart of FIG. 3 provides merely an example of the many different types of functional arrangements that may be employed to implement the operation of the portion of the validation service 121 as described herein. As an alternative, the flowchart of FIG. 3 may be viewed as depicting an example of elements of a method implemented in the server device 103 (FIG. 1) or other network-connected computing device according to one or more embodiments.

The flowchart of FIG. 3 depicts the general operation of the validation service 121 during the course of initiating and managing a peer review of a message as part of the validation. Beginning with block 303, the validation service 121 identifies the reviewers, or "peers," to which the message is to be submitted for review. The available reviewers for each sender may be defined in the reviewer data 133, and the validation rules 135 may further specify one or more particular reviewers and/or other conditions based upon the circumstances for the message. For example, if the recipients of the message are personal contacts, the reviewer may be a personal friend, whereas if the recipients are various media outlets, a public relations (PR) representative may be the reviewer.

Next, in block 306, the validation service 121 determines the preferred contact method for the reviewer(s) for this particular message. The reviewer data 133 may include one or more contact methods for each reviewer, as well as criteria for determining preferred and alternate methods of contact for each of the reviewers. For example, during business hours, the preferred contact method for a reviewer is at their laptop, whereas after business hours, contact via their smartphone is preferred.

Then, in block 309, the validation service 121 may transmit the review request to the reviewer device 106 associated with a given reviewer using the determined best method of contact, where the review request may include a copy of the message and, potentially, the possible responses. In some instances, the review request may be transmitted to a review application 141 executing in a laptop computer, smartphone, tablet computer, or other type of computing device. However, a review request may also be transmitted to other communication devices in which no review application 141 is executing, such as via SMS/MMS, email, or other communication medium as can be appreciated. In addition, the validation rules 135 may further specify the structure of the response that may be provided by the reviewer(s). This response to the message from the reviewer(s) may be a binary "allow" or "reject," permit the reviewer(s) to edit the message to indicate an acceptable form, or to accept or reject the message, but also provide comments to include in the response.

Continuing, in block 312, the validation service 121 determines whether all the necessary responses have been received in response to the review requests for the message. For example, the validation rules 135 may have specified that five reviewers should receive review requests, and that an action may be automatically initiated if three of the reviewers recommend it in their response. In this instance, the validation service 121 may proceed if two responses have not yet been received so long as the three that have been received recommend the same action.

If not all the necessary responses have been received, then, in block 315, the validation service 121 determines if a timeout period has elapsed awaiting the missing response(s). If the timeout has not yet elapsed, then execution of the validation service 121 returns to block 312. Alternatively, if the timeout has elapsed, in block 318, the validation service 121 identifies any alternate contact method for the reviewers for whom a response period has passed. Thereafter, execution of the validation service 121 returns to block 309 to transmit review requests to the alternate contact method for the reviewers that have not yet responded. In the event necessary responses are not received from any reviewers, the validation rules 135 may specify an alternate course of action for validation of the message.

Returning to block 312, if all necessary responses have been received, the validation service 121 may at step 321 determine and/or initiate the action for the message based at least in part on the received response(s). As mentioned, the criteria for the action to be performed may be specified in the validation rules 135. For example, the validation rules 135 may specify that if all or a certain percentage of the reviewer(s) recommend a particular action, that action is automatically initiated. As another example, if the recommendations are mixed, the validation rules 135 may require using another type of examination, another reviewer, and/or another activity in order to determine the action.

Next, in block 324, the validation service 121 logs various data associated with the aforementioned peer review examination which may include the message itself, the review request(s), the reviewer(s) to which the review request(s) were transmitted, the responses received, any action or next activity initiated as a result of the peer review examination. Thereafter, this portion of the execution of the validation service 121 ends as shown.

Figure 4:
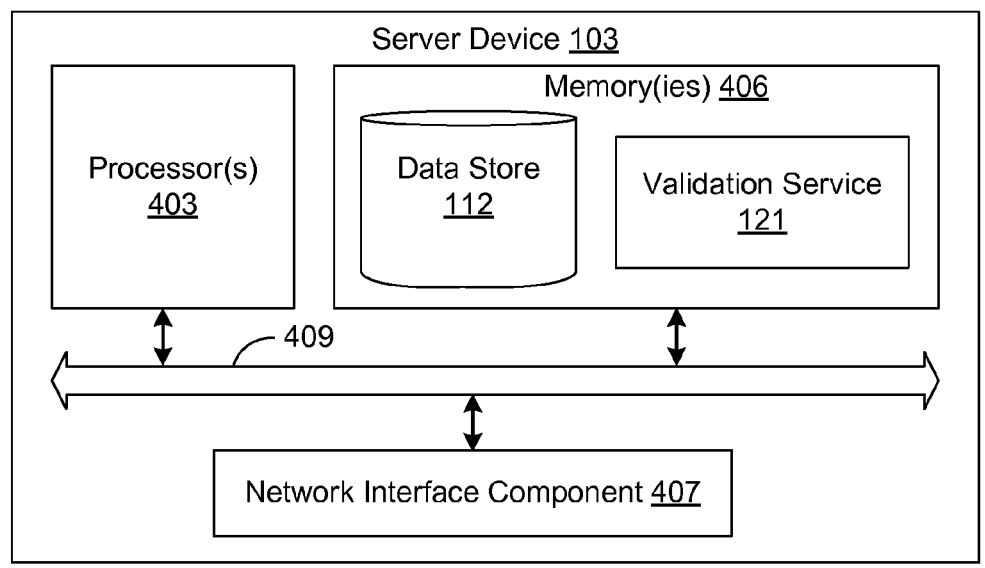
FIG. 4 is a schematic block diagram that provides one example illustration of a server device employed in the networked environment of FIG. 1 according to various embodiments of the present disclosure.

With reference to FIG. 4, shown is a schematic block diagram of certain basic components of an exemplary computing system, which in some embodiments may be exemplary of components of the server device 103, sender device 105 and/or the reviewer device 106 describe herein. The exemplary computing system includes at least one processor circuit, for example, having a processor 403, a memory 406, a network interface component 407, all of which are coupled to a local interface 409. The local interface 409 may comprise, for example, a data bus with an accompanying address/control bus or other bus structure as can be appreciated. The network interface component 407 enables the exemplary computing system to send and receive data via the network 109. The network interface component 407 may be implemented as an Ethernet interface, cellular radio, Wi-Fi™ transceiver and/or other type of network interface appropriate for a given type of network 109.

Stored in the memory 406 are both data and several components that are executable by the processor 403. In particular, stored in the memory 406 and executable by the processor 403 are the validation service 121, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the illustrated processor 403 may represent multiple processors 403 and/or multiple processor cores and the illustrated memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the validation service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the validation service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the validation service 121, the messaging application 139, and the review application 141, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the validation service 121, the messaging application 139, and the review application 141, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same server device 103 or other possible computing devices. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    obtaining, in a computing device, a message to be transmitted via a network to a plurality of recipients, the message being generated by a sender;
    determining, in the computing device, an action to be initiated in response to the message, the action being determined based upon a set of rules and an examination comprising a review of the message by a group of people selected by the sender, said group comprising ones of a group of candidate reviewers who accepted an invitation to review messages from the sender, a result of the examination indicating whether the message is allowable based upon content of the message or metadata associated with the message, the set of rules defining the action in response to the result; and
    initiating, in the computing device, the action determined for the message, the action comprising at least one of: transmitting the message to the recipients, requesting the sender to review the message, modifying the message, and deleting the message, wherein the set of rules specify that the action should be automatically initiated if, in the result, a threshold number of the group of people recommend the action.

2. The method of claim 1, further comprising generating, in the computing device, a review request for the group of people to review the message.

3. The method of claim 2, wherein the review request further specifies a time of day associated with creation of the message.

4. The method of claim 2, wherein the review request further specifies a messaging service associated with the message.

5. A computing device, comprising:
a network interface for communicating via a network accessible to the computing device;
a memory for storing a validation service, wherein the validation service comprises computer-implemented instructions for performing operations relating to a message generated by a sender to be transmitted from the computing device, via the network, to a plurality of recipients; and
a processor for executing the computer-implemented instructions of the validation service and thereby causing the validation service to:
obtain the message;
determine an examination to be performed upon the message, the examination being selected from among a set of available examinations comprising a review of the message by a group of one or more people selected by the sender, said group comprising ones of a group of candidate reviewers who accepted an invitation to review messages from the sender, the review indicating if the message is allowable based upon content of the message or metadata associated with the message; and
initiate an action for the message, the action being determined based upon a result of the examination, the action comprising at least one of: transmitting the message to the recipients, requesting the sender to review the message, modifying the message, and deleting the message, wherein the set of rules specify that the action should be automatically initiated if, in the result, a threshold number of the group of people recommend the action.

6. The computing device of claim 5, wherein the set of available examinations further comprises determining if the message is allowable based upon the content of the message, metadata associated with the message, and predefined personal data associated with the sender.

7. The computing device of claim 6, wherein the result of the examination is based upon the review received, via the network, from at least one of the group of people when the examination selected is the review of the message by the group of people.

8. The computing device of claim 6, further comprising logic that sends a system notice to the sender if the message is not allowable.

9. The computing device of claim 8, wherein the system notice comprises a reason that the message is not allowable, the sender being permitted to at least modify the message in response to the reason.

10. The computing device of claim 6, wherein content of the message comprises at least one of: text, imagery, video, and audio.

11. The computing device of claim 5, further comprising logic that stores a log comprising the message, the review of the message, and the action initiated for the message.

12. The computing device of claim 5, wherein the examination for the message is determined based upon a set of rules specified for the sender.

13. The computing device of claim 5, wherein the examination for the message is determined based upon input obtained, via a user interface, from the sender.

14. A non-transitory computer-readable medium comprising a program executable in a computing device, the program comprising code that when executed by a processor causes the computing device to:
obtain a message to be transmitted via a network to a plurality of recipients, the message being generated by a sender;
determine an examination to be performed upon the message, the examination being selected from among a set of available examinations comprising a review of the message by a group of people selected on behalf of the sender, said group comprising ones of a group of candidate reviewers who accepted an invitation to review messages from the sender, the review indicating if the message is allowable based upon content of the message or metadata associated with the message; and
initiate an action for the message, the action being determined based upon a result of the examination, the action comprising at least one of: transmitting the message to the recipients, requesting the sender to review the message, modifying the message, and deleting the message, wherein the set of rules specify that the action should be automatically initiated if, in the result, a threshold number of the group of people recommend the action.

15. The non-transitory computer readable medium of claim 14, further comprising code that generates a review request for the group of people when the review of the message by the group of people is the examination determined to be performed, the review request providing access to the content of the message and the metadata associated with the message.

16. The non-transitory computer readable medium of claim 15, wherein the review request is transmitted via a preferred contact method associated with individual ones of the group of people.

17. The non-transitory computer readable medium of claim 14, wherein the metadata further comprises identification of a media service through which the message is to be transmitted to the recipients.

18. The non-transitory computer readable medium of claim 14, wherein the metadata associated with the message further comprises a geographic location of a communication device from which the sender generated the message.

19. The non-transitory computer readable medium of claim 14, wherein the set of available examinations further comprises a challenge-response test to be performed by the sender.

20. A method, comprising:
obtaining, in a computing device, a message to be transmitted via a network to a plurality of recipients, the message being generated by a sender;
determining, in the computing device, an examination to be performed upon the message, the examination being selected from among a set of available examinations comprising at least one of: an automated examination of content or metadata associated with the message, a challenge-response examination, and a review of the message by a group of people selected by the sender, said group comprising ones of a group of candidate reviewers who accepted an invitation to review messages from the sender, the review indicating if the message is allowable based upon content of the message or metadata associated with the message; and
initiating, in the computing device, an action for the message, the action being determined based upon a result of the examination, the action comprising at least one of: transmitting the message to the recipients, requesting the sender to review the message, modifying the message, and deleting the message, wherein the set of rules specify that the action should be automatically initiated if, in the result, a threshold number of the group of people recommend the action.

21. The method of claim 20, wherein the automated examination further comprises a comparison with personal data specified for the sender.

22. The method of claim 20, wherein the examination for the message is determined based upon a set of rules specified for the sender.

23. The method of claim 20, wherein the examination for the message is determined based upon input obtained, via a user interface, from the sender.

* * * * *